March 27, 1928.

G. NEWVILLE

ATTACHMENT FOR FISHING REELS

Filed May 23, 1927

1,663,853

Inventor
George Newville
By Frank E. Liverana, Jr.
Attorney

Patented Mar. 27, 1928.

1,663,853

UNITED STATES PATENT OFFICE.

GEORGE NEWVILLE, OF MUSKEGON, MICHIGAN.

ATTACHMENT FOR FISHING REELS.

Application filed May 23, 1927. Serial No. 193,502.

This invention relates to an attachment used in connection with fishing reels in mounting the same upon a fishing rod. It is an object and purpose of the present invention to provide such attachment whereby the reel may be mounted upon the rod so that it can be turned a limited extent about an axis and this turning, being governed by the one holding the rod, the reel may be moved as the line is being wound thereon to guide the line and cause it to wind evenly on the reel. The attachment is of a very simple and economical construction, may be used with any reel and with it it is not necessary to have built with the reel any line guiding mechanism such as is used in some of the more expensive reels.

For an understanding of the invention reference may be had to the following description taken in connection with the accompanying drawing, in which, Fig. 1 illustrates in a plan a reel with the attachment of my invention associated therewith connected to a pole or rod.

Like reference characters refer to like parts in the different figures of the drawing.

Figure 1:
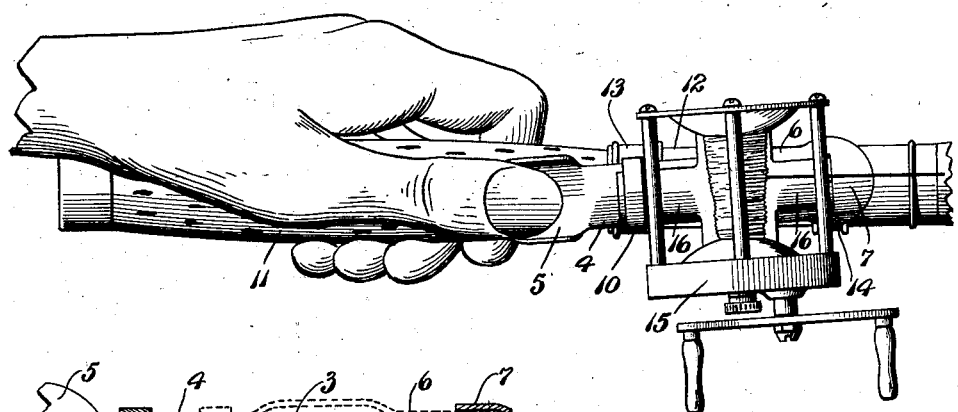
Figure 3:
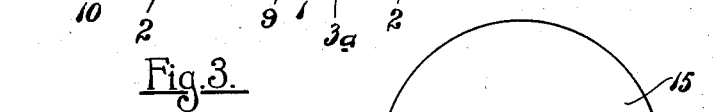
Fig. 3 is a longitudinal vertical section through the attachment.

In the construction of the attachment with which the reel is to be associated, a flat elongated bar of metal is used having an intermediate section 1 between its end sections 2 pressed upwardly so as to lie in a plane slightly above the plane of the ends 2. Lying directly over this bar or lower member is a second member formed with intermediate depressed section 3 which lies flat against the upper side of the section 1 and from which, at one end, a section 4 extends and terminates in a thumb engaging portion 5. From the opposite end of the intermediate section 3 a section 6 extends opposite to the part 4 and at its end terminates in an upwardly pressed portion 7 which at its inner end is cut partly away from its associated section 6 thereby leaving an open slot 8 between the adjacent ends of the parts 6 and 7, the purpose of which will be later described. The two sections 4 and 6 lie in a plane somewhat above the plane of the intermediate section 3.

The two members are pivotally connected together by means of a pivot 9 which passes through the contacting intermediate sections 1 and 3 of the two members. The intermediate section 3 of the upper member at its edges is formed with downwardly extending lips 3ª. The upper member is formed of metal wider than the metal used in the lower member so that the flanges 3ª are spaced short distances from the edges of the intermediate section 1 of the lower member, thereby permitting a limited rocking movement of the upper member with respect to the lower member about the axis of the pivot 9. Around the section 4 of the upper member a loop 10 of metal is placed and is freely slidable thereon.

Figure 2:
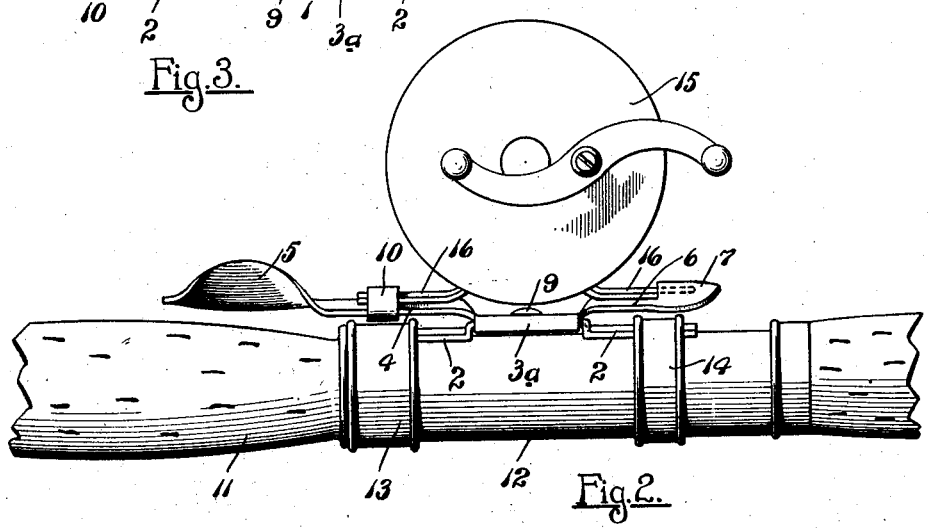
Fig. 2 is a side elevation of the construction shown in Fig. 1.
Figure 4:
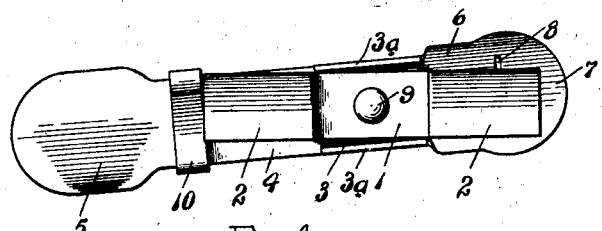
Fig. 4 is an under plan view of said attachment.

A pole or rod 11 of conventional construction has a cylindrical portion 12 at one end of which is a ring 13 spaced at its upper side from the part 12, so that one of the end sections 2 of the lower member of the attachment may be readily inserted thereunder. On the cylindrical portion 12 a ring 14 is mounted for free movement and it may be slipped over the opposite end section 2 as shown in Fig. 2. In fact practically, all fishing rods are supplied with this or a similar construction for the attachment of a fishing reel thereto. Instead of attaching the reel directly to the pole as heretofore done the attachment which I have devised is attached to the pole in the same manner as the reel heretofore has been attached.

The reel 15 may be of any conventional construction being mounted on a base having oppositely extending arms 16 which heretofore have been engaged with the parts 13 and 14 on the rod. With my invention one of the arms 15 is passed through the slot 8 so as to extend underneath the raised portion 7 while the other arm lies against the section 4 and the loop 10 is moved to pass thereover and releasably connect said arm 16 to the section 4 as shown in Fig. 2. The reel is thereupon securely mounted upon the rod though it is obvious that it may be removed when desired. The thumb engaging portion 5 of the upper member of this attachment extends partly over the handle of the rod so that the thumb of the one holding the rod may engage therewith. In reeling in the line, with the thumb engaging part 5, it is evident that the reel may be rocked back and forth about the pivot 9 and in this manner the line guides to the reel so that it will wind smoothly thereon.

The construction described is very simple yet practically effective for the purposes for which it is designed. Reels made without line guiding attachments can be supplied with this attachment at very low cost and at much less than the difference between the cost of such reels and the more expensive line guiding reels. The attachment comprises but three parts all made of sheet metal easily formed and assembled and it is durable and efficient as is evident. The invention is defined in the appended claims and is to be considered comprehensive of all forms of structure coming within their scope.

I claim:

1. A device of the class described comprising, an elongated base, an elongated member of metal lying substantially parallel to and above the base, means for pivotally connecting said members between their ends, means for limiting the pivotal movement of said member with respect to the base and means for detachably connecting a reel to said member in the upper side thereof.

2. A device of the class described comprising, an elongated base of metal, a member located above said base substantially parallel thereto, said member being somewhat wider than the width of the base and having a flange at each side turning downwardly at right angles at the intermediate portion of the base whereby said member may have a limited rocking movement with respect to the base, and means for detachably connecting a reel to said member at the upper side thereof.

3. In a construction of the class described, an elongated base having a raised intermediate portion, an elongated member of metal having a depressed intermediate portion, the lower side of which bears against the upper side of the raised portion of the base, means pivotally connecting said member and base at their contacting intermediate portions so that the member may turn about a vertical axis, means extending downwardly from said member at each side of the raised portion of the base and normally spaced a short distance therefrom to limit the pivotal movement of said member, and means for releasably connecting a reel to said member at its upper side.

4. A device of the class described comprising, an elongated base of flat metal, a member of flat metal located over and substantially parallel to said base, means pivotally connecting said member and base at a point intermediate their ends, one end of said member having a portion struck upwardly therefrom thereby providing a slot between its inner end and the adjacent part of the member from which it is struck, and the other end of said member being formed into a concave thumb engaging part, and a loop surrounding said member and slidable thereon adjacent the thumb engaging part thereof, whereby one end of the base of a fishing reel may be placed through said slot and the other end releasably connected with said member by passing the loop thereover.

5. A device of the class described comprising, an elongated base and an elongated member located above and substantially parallel to the base, means pivotally connecting said member to the base at a point intermediate their ends, and means for detachably connecting a fishing reel to said member at its upper side.

In testimony whereof I affix my signature.

GEORGE NEWVILLE.